Dec. 24, 1946. J. S. MORGAN, JR., ET AL Re 22,825

SWIVEL

Original Filed Nov. 26, 1934 3 Sheets-Sheet 1

Inventors
Demery A. Murphy
John S. Morgan Jr.
By Lyon & Lyon Attorneys

Dec. 24, 1946. J. S. MORGAN, JR., ET AL Re 22,825

SWIVEL

Original Filed Nov. 26, 1934 3 Sheets-Sheet 2

Inventors
Demery A. Murphy
John S. Morgan Jr.
By Lyon & Lyon Attorneys

Dec. 24, 1946. J. S. MORGAN, JR., ET AL Re 22,825

SWIVEL

Original Filed Nov. 26, 1934 3 Sheets-Sheet 3

Inventors
Demery A. Murphy
John S. Morgan Jr.
By Lyon & Lyon Attorneys

Reissued Dec. 24, 1946

Re. 22,825

UNITED STATES PATENT OFFICE 22,825

SWIVEL

John S. Morgan, Jr., Manhattan Beach, and Demery A. Murphy, Torrance, Calif., assignors to The National Superior Company, Toledo, Ohio, a corporation of Delaware Original No. 2,029,631, dated February 4, 1936, Serial No. 754,806, November 26, 1934. Application for reissue March 30, 1946, Serial No. 658,366

14 Claims. (Cl. 255—25)

This invention relates to rotary swivels of the type employed in connection with the drilling of oil, gas, water or other wells, by the rotary process or method, and is more particularly directed to the wash pipe assembly included in such a rotary swivel.

An object of this invention is to provide a wash pipe assembly which can be inserted and removed from the assembly without requiring the disconnection of the circulating hose.

Another object of this invention is to provide a wash pipe construction wherein there is provided a removable cap or plug member which will allow the entry or removal of devices through the drill stem without disassembling the wash pipe from the swivel.

Another object of this invention is to provide a wash pipe assembly including a wash pipe member that is reversible end for end to thereby extend the life of the swivel construction in service to twice that heretofore possible.

Another object is to provide a wash pipe assembly wherein the wash pipe is provided with a water jacket for the circulation of a cooling liquid or water around that portion of the wash pipe that is in contact with the stuffing box carried by the rotary sleeve.

Other objects and advantages of this invention it is believed will be apparent from the following detailed description of a preferred embodiment thereof as illustrated in the accompanying drawings.

Figure 1:
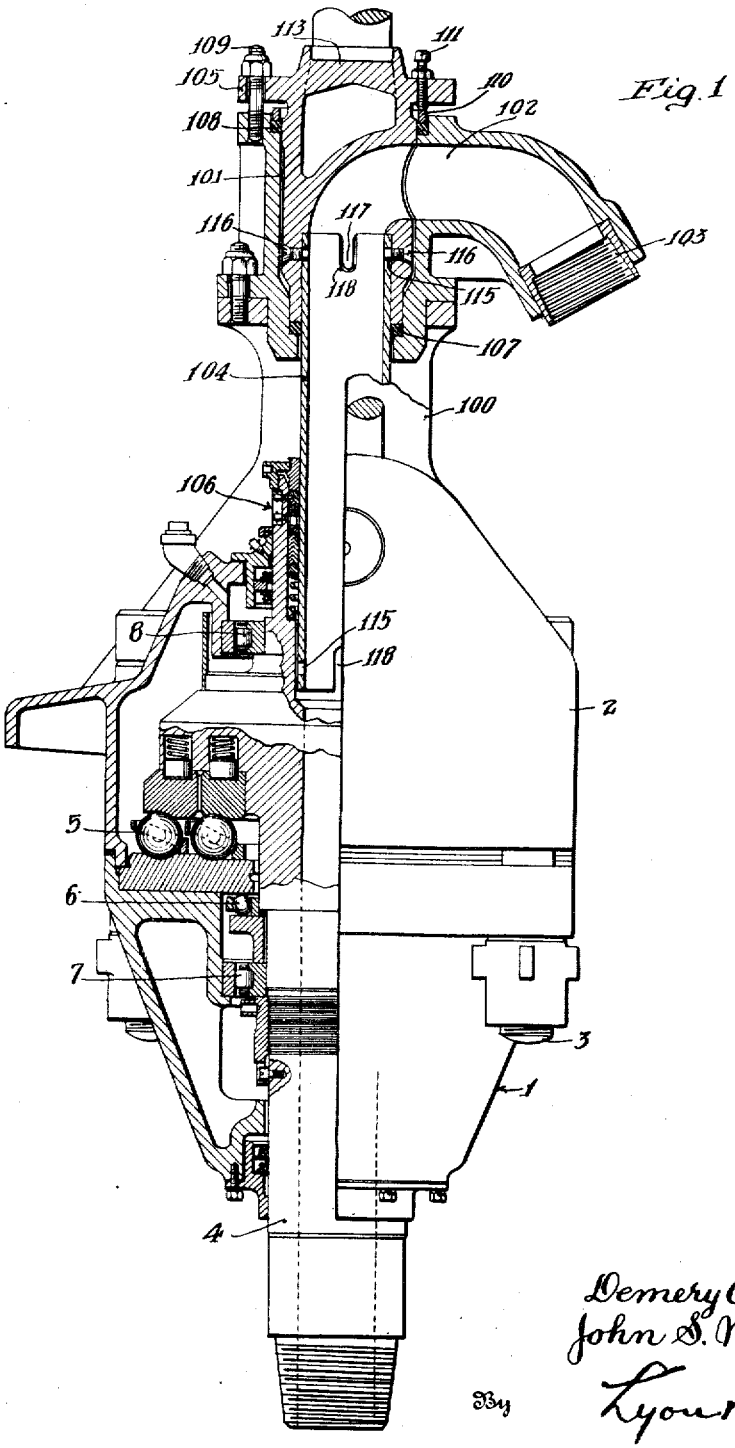
Figure 1 is a side elevation partly in vertical mid-section of the swivel embodying our invention.
Figure 2:
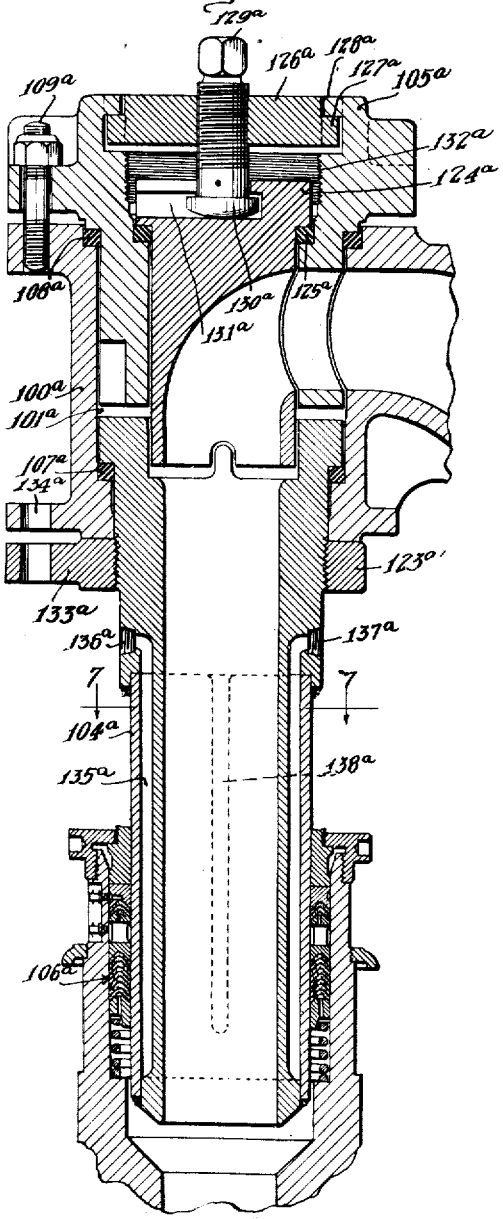
Figure 2 is an enlarged sectional side elevation illustrating a modified form of the wash pipe assembly mounted in position upon its stationary support.
Figure 3:
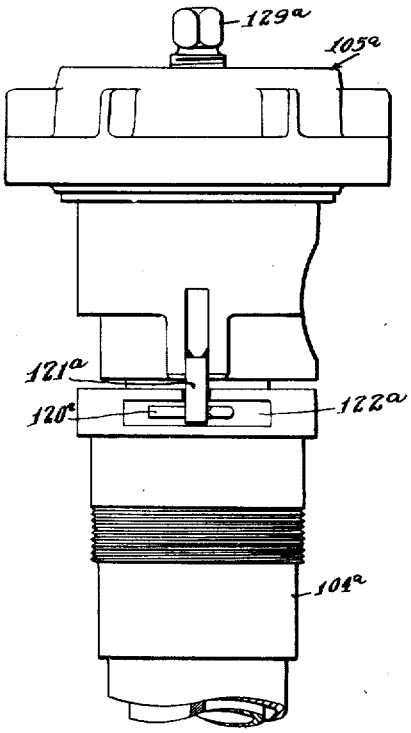
Figure 3 is a side elevation of the wash pipe assembly construction embodying our invention.
Figure 4:
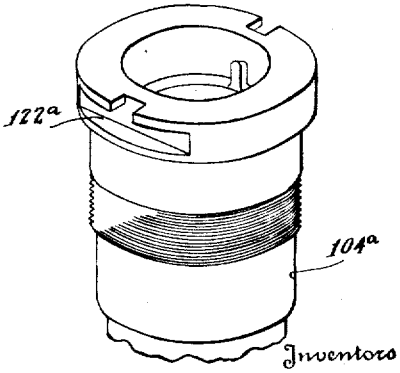
Figure 4 is a perspective view illustrating the construction of the upper end of the wash pipe.
Figure 5:
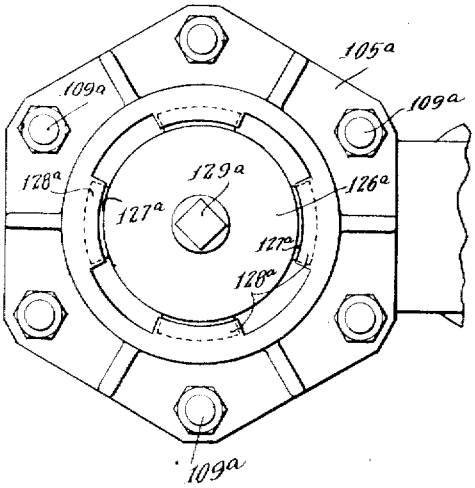
Figure 5 is a top plan view of the wash pipe assembly as illustrated in Figure 2.
Figure 6:
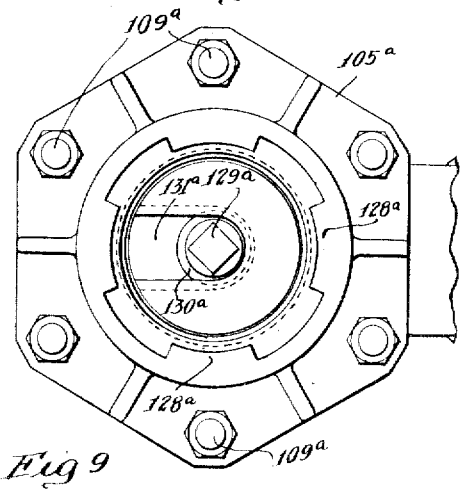
Figure 6 is a top plan view similar to Figure 5 illustrating the assembly with the removable plate removed.

This invention is directed to an improvement upon the wash pipe construction of a swivel and while the swivel as herein illustrated is illustrated in its detailed construction, it is to be understood that this invention is not in any way limited in its applicability to a type of swivel as herein shown. The swivel construction as herein shown is the subject matter of the copending application of Edward Timbs and Demery A. Murphy, Serial No. 749,374, for Swivel, filed October 22, 1934, now Patent No. 2,029,598, granted February 4, 1936.

The swivel as herein illustrated includes a body 1 to which a cap member 2 is removably secured by means of bolts 3. A rotary sleeve 4 is rotatably supported within the body 1 upon main supporting bearings 5 and is supported against an upward thrust by means of the upthrust bearing 6 and is supported in its radial position by means of spaced radial bearings 7 and 8.

Further details of the construction of the swivel as illustrated are specifically set forth and described in Patent No. 2,029,598, above referred to.

Figure 9:
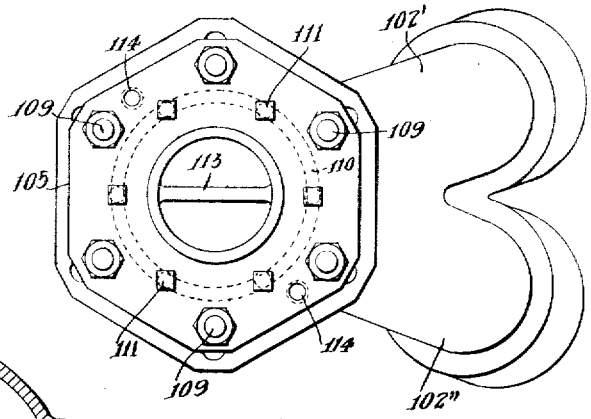
Figure 9 is a top plan view of the swivel assembly illustrated in Figure 1 in which there are two inlets provided for the circulating fluid.

The upper end of the swivel cap member 2 is provided with a detachable wash pipe and circulating hose support 100 which has a vertical opening 101 and a lateral opening 102 which is in communication with the circulating hose as adapted to be coupled thereto by the coupling 103. As indicated in Figure 9, the support may be provided with two lateral openings 102′ and 102″ for connection to two circulating hoses.

The wash pipe assembly includes a replaceable wash pipe 104 and a cap member 105. This assembly is preferably made in two parts consisting of the cap member 105 and the reversible wash pipe 104 so that the entire assembly may be inserted through the vertical opening 101 of the wash pipe support 100. The wash pipe 104 is the element that is frequently replaced due to wear occurring within the packing assembly 106 positioned within the upper part of the rotary sleeve 4.

As illustrated in Figure 1, the cap member 105 is provided with a curved passage which establishes communication between the lateral passage 102 and the upper end of the wash pipe 104. The wash pipe assembly is packed off within the opening 101 above and below the lateral opening 102 by means of a lower packing 107 and an upper packing 108. The lower packing 107 is compressed into sealing relation with the wash pipe 104 through the medium of clamping bolts 109 which secure the assembly in position with relation to the support 100. The upper packing 108 is independently compressed through the medium of a gland ring 110 which compresses said packing into contact with the support bore and the cap 105 by means of a plurality of set screws 111. It also will be noted that the cap member 105 is centered relative to the support 100 so as to accurately position the wash pipe 104 in alignment with the rotary sleeve 4.

The order in which this assembly is made is to compress the packing 107 and then compress the packing 108. The packing pressure applying means 109 and 111 are positioned upon the upper face of the wash pipe assembly so as to render the operation of assembling the packing of the wash pipe assembly as simple as possible.

A web member is provided in the upper end of the cap 105 for the purpose of facilitating the removal of the assembly by attaching a hook under the web 113 and extracting the assembly from the swivel. In the event that the assembly should become rusted into the support, threaded holes 114 are provided in the cap member 105 so that jack screws can be employed to eject the wash pipe assembly from the support.

The wash pipe 104 is so constructed as to be reversible end for end, and in order to connect the wash pipe 104 to the cap 105, there is provided a plurality of holes 115 adapted to receive screws 116 which are threaded into the cap member 105. In order to relieve the screw 116 of any torque which is incident to the rotation of the sleeve 4 in the stuffing box 106, we provide the lower end of the cap member 105 with a key 117 adapted to fit within a keyway 118 formed in the end of the wash pipe 104.

As illustrated in Figure 1, the upper half of the wash pipe 104 has no engagement with the rotating stuffing box 106 and consequently is not exposed to any wear or abrasion. Therefore, upon the lower half of the wash pipe becoming worn due to abrasion of the stuffing box, the wash pipe can be turned end for end and the half which is secured to the cap then will be positioned within the rotary sleeve with the unworn surface in contact with the rotary stuffing box.

In order to permit this reversal, the lower end of the wash pipe 104, as viewed in Figure 1, is provided with a similar keyway 118 and with holes 115 for the reception of the screws 116 upon reversal of the wash pipe. This reversal of the wash pipe 104 permits very economical use of the swivel because in constructions of this type the wash pipe at its best is operating under the most adverse conditions due to the fact that the circulating fluid which is caused to pass through the swivel contains a very high percentage of very fine sand circulated under high pressure with a comparatively high rotative speed between the sleeve 4 and the wash pipe 104.

In the modified form of our invention illustrated in Figures 2 to 7, inclusive, similar parts have been indicated by the same numerals with the addition of an exponent thereto.

In this modified form of construction, 100ᵃ indicates the support for the wash pipe assembly which may be formed integrally with the cap member. The circulating hose wash pipe cap 105ᵃ is connected to the wash pipe 104ᵃ through the medium of a cotter pin 120ᵃ which is insertable within a downwardly depending key member 121ᵃ which is designed to prevent the relative rotation of the cap member 105a and wash pipe 104ᵃ. The cotter pin 120ᵃ fits within a transverse slot 122ᵃ formed in the upper flanged portion of the wash pipe 104ᵃ.

The slot 122ᵃ is of sufficient width to permit of relative axial movement between the cap and the wash pipe in order to compensate for the difference in compression of the upper and lower packing rings 107ᵃ and 108ᵃ. The upper packing ring 108ᵃ is compressed through the medium of the bolts 109ᵃ and the lower packing ring 107ᵃ is compressed through the medium of a ring 123ᵃ which is threadedly engaged with the upper end of the wash pipe 104ᵃ and engages the underside of the support 100ᵃ. There is thus provided an independent means for compressing each of the packings 107ᵃ and 108ᵃ.

Upon the ring 123ᵃ and the bolts 109ᵃ being removed, the wash pipe assembly is removable upwardly through the opening 101ᵃ of the support 100ᵃ.

In order to permit the insertion of any tool or device downwardly through the drill stem without disconnecting the swivel from the drilling string, there is provided a detachable plug 124ᵃ which is positioned within a cap member 105ᵃ. A packing ring 125ᵃ is provided between the cap 105ᵃ and the plug 124ᵃ. A detachable ring or plate 126ᵃ is insertable within the upper portion of the cap 105ᵃ and is secured to the cap through the medium of a plurality of lugs 127ᵃ formed on the plate 126ᵃ which are insertable through a complementary opening in the cap 105ᵃ and rotated to engage the overhanging lugs 128ᵃ formed on the upper face of the cap 105ᵃ.

A set screw 129ᵃ is threadedly mounted in the plate 126ᵃ and has an enlarged head 130ᵃ which engages within a T-shaped slot 131ᵃ formed in the upper end of the plug 124ᵃ.

In the construction thus provided, the plug 124ᵃ can be forced downwardly or upwardly through the action of the screw 129ᵃ. The fact that the plug can be forced upwardly is very desirable in the event the plug becomes rusted and difficult to remove.

The upper end of the cap 105ᵃ is threaded as indicated at 132ᵃ to permit the connection of any device which may be desirable in the absence of the plug 124ᵃ. A threaded ring 123ᵃ is provided with a pair of lugs 133ᵃ which can be rotated to register with a corresponding hole 134ᵃ in the support 100ᵃ. With this construction it is possible to eject a wash pipe that may be rusted in the support 100ᵃ by unscrewing the ring 123ᵃ several turns and then placing a bolt in the holes 133ᵃ and 134ᵃ and drawing the ring 123ᵃ upwardly relative to the support 100ᵃ. The lower part of the wash pipe 104ᵃ is provided with a water jacket 135ᵃ having inlet and outlet connections 136ᵃ and 137ᵃ respectively. In order to obtain a passage of fluid the full length of the jacket, there is provided a pair of partitions 138ᵃ which extend downwardly to within a short distance of the end of the water chamber. In this manner fluid will circulate downwardly in the wash pipe and will pass under the partition 138ᵃ and hence upwardly to the outlet 137ᵃ.

Under certain conditions of operation where certain geologic structures are encountered, it has been found that there is a very intense heat developed which is dissipated partly to the circulating fluid that is provided for the cutting bit. This circulating fluid is returned to the surface and then recirculated through the pumps downwardly through the swivel. The heat of this circulating fluid has been such as to impair the efficiency of the stuffing box packing 106ᵃ and therefore we prefer to provide the water jacket as heretofore described for the purpose of maintaining packing 106ᵃ at such temperature where it may operate effectively.

Figure 8:
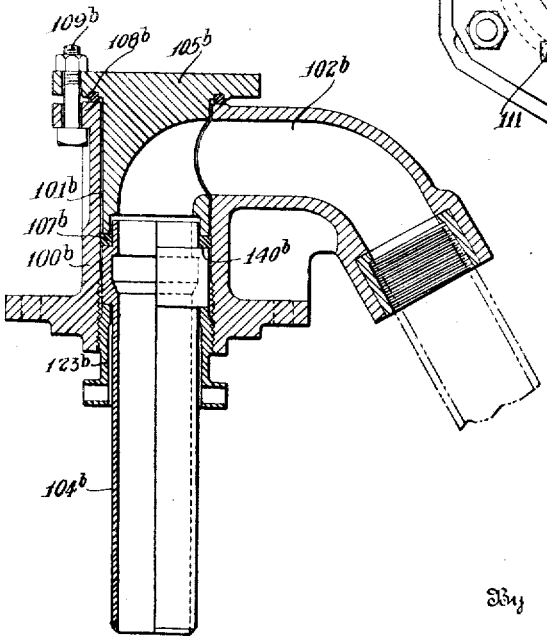
Figure 8 is a sectional side elevation of a further modified form of wash pipe assembly embodying our invention.
Figure 7:
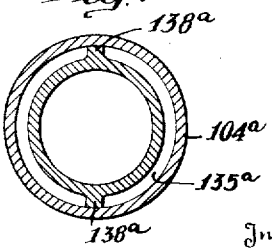
Figure 7 is a sectional end view taken substantially on the line 7—7 of Figure 2.

As illustrated in Figure 8, we have provided a detachable support 100ᵇ having a vertically extending opening 101ᵇ and a lateral opening 102ᵇ. The wash pipe 104ᵇ is assembled within the upper portion of the opening 101ᵇ and is attached to the support by means of bolts 109ᵇ. The bolts 109b also function to compress the packing 108b. The lower packing 107b is positioned between the lower end of the cap 105b and the upper face of a flange portion 140b formed in the wash pipe 104b. A threaded ring 123b is threadedly mounted within the lower end of the opening 101b to engage the under side of the flange portion of the wash pipe 104b. Rotation of the ring 123b forces the wash pipe upwardly to compress the packing 107b.

Having fully described our invention, it is to be understood that we do not wish to be limited to the details herein set forth, but our invention is of the full scope of the appended claims.

We claim:

1. In a rotary swivel, the combination of a bearing housing including upper and lower members connected together, a rotary sleeve having a fluid conducting passage being rotatably supported on bearing means within said housing, a wash pipe, said wash pipe being reversible end for end, means connected with said bearing housing to non-rotatably secure either end of said wash pipe axially of said sleeve, packing means carried by the rotary sleeve and surrounding the wash pipe to form a fluid tight rotary connection between the wash pipe and the sleeve, said packing means being position axially of the wash pipe within its half length farthest removed from its secured end.

2. In a rotary swivel, the combination of a housing, a rotary sleeve rotatably supported by said housing, a fluid conducting passage through said sleeve, a circulating hose support secured to said housing, said support having a vertically extending passage formed therethrough and a connecting lateral passage in communication with a circulating hose, a fluid conducting element, said element being positioned axially of the fluid conducting passage in the sleeve and having a passage communicating with said sleeve passage and with the lateral passage in the support, means to effect a fluid tight seal between said element and the support, means to provide a fluid tight rotary connection between the element and the sleeve, and releasable means to secure said element to the support, said element being removable upwardly through the vertically extending passage in the support upon release of the securing means.

3. In a rotary swivel, the combination of a housing, a rotary sleeve rotatably supported by said housing, a fluid conducting passage through said sleeve, a circulating hose support secured to said housing, said support having a vertically extending passage formed therethrough and a connecting lateral passage in communication with a circulating hose, a fluid conducting element, said element being positioned axially of the fluid conducting passage in the sleeve and having a passage communicating with said sleeve passage and with the lateral passage in the support, axially spaced packing means between said element and said support to effect a fluid seal on opposite sides of the lateral passage, means to provide a fluid tight rotary connection between the element and the sleeve, and means to secure said element to said support, said element being removable upwardly through the vertically extending passage in the support upon release of the element securing means.

4. In a rotary swivel, the combination of a housing, a rotary sleeve rotatably supported by said housing, a fluid conducting passage through said sleeve, a circulating hose support secured to said housing, said support having a vertically extending passage formed therethrough and a connecting lateral passage in communication with a circulating hose, a fluid conducting element, said element being positioned axially of the fluid conducting passage in the sleeve and having a passage communicating with said sleeve passage and with the lateral passage in the support, compressible packing means spaced axially of said element between said element and support to effect a fluid seal on opposite sides of the lateral passage, means including pressure applying means to independently compress the respective packing means and secure the element to said support, and means to provide a fluid tight rotary connection between the element and the sleeve, said element being removable upwardly through the vertically extending passage in the support upon retrieval of the pressure applying means.

5. In a rotary swivel, the combination of a housing, a rotary sleeve rotatably supported by said housing, a fluid conducting passage through said sleeve, a circulating hose support secured to said housing, said support having a vertically extending passage formed therethrough and a connecting lateral passage in communication with a circulating hose, a fluid conducting element, said element being positioned axially of the fluid conducting passage in the sleeve and having a passage communicating with said sleeve passage and with the lateral passage in the support, compressible packing means spaced axially of said element between said element and support to effect a fluid seal on opposite sides of the lateral passage, means including pressure applying means accessible above the upper face of said support to independently compress the respective packing means, one of said pressure applying means cooperating to secure the element to said support, and means to provide a fluid tight rotary connection between the element and the sleeve, said element being removable upwardly through the vertically extending passage in the support upon retrieval of the pressure applying means.

6. In a rotary swivel, the combination of a housing, a rotary sleeve rotatably supported by said housing, a fluid conducting passage through said sleeve, a circulating hose support secured to said housing, said support having a vertically extending passage formed therethrough and a connecting lateral passage in communication with a circulating hose, a fluid conducting element, said element being positioned axially of the fluid conducting passage in the sleeve and having a passage communicating with said sleeve passage and with the lateral passage in the support, said element including a flanged tubular member, a cap member and means to connect said members to permit of limited relative axial movement, compressible packing means to effect a seal between the flanged portion of said tubular member and said support, means to independently effect a seal between said cap member and said support, means to provide a fluid tight rotary connection between the tubular member and the sleeve, and means to secure the element to said support, said element being removable upwardly through the vertically extending passage in the support upon release of the element securing means.

7. In a rotary swivel, the combination of a housing, a rotary sleeve rotatably supported by said housing, a fluid conducting passage through said sleeve, a circulating hose support secured to said housing, said support having a vertically extending passage formed therethrough and a connecting lateral passage in communication with a circulating hose, a fluid conducting element, said element being positioned axially of the fluid conducting passage in the sleeve and having a passage communicating with said sleeve passage and with the lateral passage in the support, removable closure means positioned in the upper end of said element, means to effect a fluid tight seal between said element and the support, means to provide a fluid tight rotary connection between the element and the sleeve, and releasable means to secure said element to the support, said element being removable upwardly through the vertically extending passage in the support upon release of the securing means.

8. In a rotary swivel, the combination of a housing, a rotary sleeve rotatably supported by said housing, a fluid conducting passage through said sleeve, a circulating hose support secured to said housing, said support having a vertically extending passage formed therethrough and a connecting lateral passage in communication with a circulating hose, a fluid conducting element, said element being positioned axially of the fluid conducting passage in the sleeve and having a passage communicating with said sleeve passage and with the lateral passage in the support, a removable closure means in said element providing a curved fluid passage communicating with the axial passage of the element and the lateral passage of the support, means to effect a fluid tight seal between said element and the support, means to provide a fluid tight rotary connection between the element and the sleeve, and releasable means to secure said element to the support, said element being removable upwardly through the vertically extending passage in the support upon release of the securing means.

9. In a rotary swivel, the combination of a bearing housing, a rotary sleeve having a fluid conducting passage being rotatably supported on bearing means within said housing, a circulating hose support secured to said housing, a wash pipe non-rotatably secured relative to said support axially of the sleeve passage, said support having a vertically extending opening through which the wash pipe is insertable and a connecting lateral opening, said lateral opening having communication with a circulating hose, packing means between said wash pipe and said support, a cap member detachably secured to said support to close the opening above the wash pipe, and packing means to form a fluid tight rotary connection between the wash pipe and the sleeve.

10. In a rotary swivel, the combination of a bearing housing, a rotary sleeve having a fluid conducting passage being rotatably supported on bearing means within said housing, a circulating hose support secured to said housing, a wash pipe non-rotatably secured relative to said support axially of the sleeve passage, said support having a vertically extending opening through which the wash pipe is insertable and a connecting lateral opening, said lateral opening having communication with a circulating hose, packing means between said wash pipe and said support, a cap member detachably secured to said support to close the opening above the wash pipe, packing means to form a fluid tight rotary connection between the wash pipe and the sleeve, and means operably connected with the support and the wash pipe for ejecting the wash pipe from the support.

11. In a rotary swivel, the combination of a bearing housing, a rotary sleeve having a fluid conducting passage being rotatably supported within said housing, a wash pipe, means connected with said housing to non-rotatably secure said wash pipe axially of said sleeve, a cooling liquid circulating chamber formed in said wash pipe, packing means carried by the rotary sleeve and surrounding the circulating chamber portion of the wash pipe to form a fluid tight rotary connection between the wash pipe and the sleeve, and circulating connections in communication with said chamber to provide for the admission and discharge of the cooling liquid passing through said chamber.

12. In a rotary swivel, the combination of a bearing housing member, a rotary sleeve member having a fluid conducting passage rotatably supported on bearing means within said housing member, a wash pipe, said wash pipe being reversible end for end, means connected with one of said members to non-rotatably secure either end of the wash pipe axially of the member, packing means carried by the other of said members and surrounding the wash pipe to form a fluid tight rotary connection, said packing means being positioned axially of the wash pipe within its half length farthest removed from its secured end.

13. In a rotary swivel having a housing, a rotary sleeve rotatably supported by said housing, a fluid conducting passage through the sleeve, a circulating hose support secured to the housing, said support having a vertically extending passage formed therethrough and a connecting lateral fluid passage, a fluid conducting element, the latter said element being positioned axially of the fluid conducting passage in the sleeve and having a passage communicating with the sleeve passage and with the lateral passage in the support, the combination of a cap member carried by the support and provided with a central opening, a removable plug member carried by the cap member to close the opening, packing means positioned between the plug member and the cap member and between the cap member and the support, separate means associated with the cap member for expanding each of said packing means, one of said separate means being operable to retrieve said plug member, and means on said cup member adapted to provide a coupling connection upon the plug member being removed.

14. In a rotary swivel having a housing, a rotary sleeve rotatably supported by the housing, a fluid conducting passage through the sleeve, a circulating hose support secured to the housing, said support having a vertically extending passage formed therethrough and a connecting lateral passage, a fluid conducting element, said element being positioned axially of the fluid conducting passage in the sleeve and having a passage communicating with the sleeve passage and with the lateral passage in the support, the combination of a cap member secured to the support, said cap member having a full opening aligned with the passage in the fluid conducting element, a removable plug member to close the opening, and means on the cap member to provide a coupling connection upon the plug member being removed.

JOHN S. MORGAN, JR.
DEMERY A. MURPHY.

Certificate of Correction

Reissue No. 22,825 December 24, 1946.

JOHN S. MORGAN, JR., ET AL.

It is hereby certified that the name of the assignee in the above numbered patent was erroneously described and specified as "The National Superior Company, Toledo, Ohio, a corporation of Delaware" whereas said name should have been described and specified as *The National Supply Company, Pittsburgh, Pa., a corporation of Pennsylvania*, as shown by the record of assignments in this Office; and that the said Letters Patent should be read with this correction therein that the same may conform to the record of the case in the Patent Office.

Signed and sealed this 4th day of March, A. D. 1947.

[SEAL]

LESLIE FRAZER,
*First Assistant Commissioner of Patents.*